United States Patent [19]

Fathauer

[11] 3,873,924

[45] Mar. 25, 1975

[54] SIGNAL-SEEKING RADIO RECEIVERS

[75] Inventor: George H. Fathauer, Decatur, Ill.

[73] Assignee: Masco Corporation of Indiana, Greensburg, Ind.

[22] Filed: Nov. 2, 1972

[21] Appl. No.: 303,016

[52] U.S. Cl. .................. 325/470, 325/458, 325/334
[51] Int. Cl. ............................................ H04b 1/34
[58] Field of Search ............. 325/31, 318, 319, 346, 325/349, 397, 416–422, 489, 334–336, 452–454, 465, 468–479; 334/13, 16, 18, 14–16; 343/205

[56] References Cited

UNITED STATES PATENTS

| | | | |
|---|---|---|---|
| 3,517,352 | 6/1970 | Marshall et al. | 325/465 X |
| 3,531,724 | 9/1970 | Fathauer | 325/469 |
| 3,575,662 | 4/1971 | Davisson | 334/15 X |
| 3,579,115 | 5/1971 | Goncharoff et al. | 325/453 X |
| 3,588,706 | 6/1971 | Sakai et al. | 325/417 |
| 3,657,654 | 4/1972 | Friberg | 325/452 |
| 3,699,455 | 10/1972 | Kruszeuski | 334/15 |
| 3,743,943 | 7/1973 | Mason et al. | 325/16 |
| 3,750,030 | 7/1973 | Worcester | 325/468 X |

*Primary Examiner*—Benedict V. Safourek
*Assistant Examiner*—Aristotelis M. Psitos

[57] ABSTRACT

In a signal-seeking radio receiver which includes an antenna, means for automatically and sequentially tuning to a plurality of predetermined radio frequencies, and means for reproducing the intelligence therein; a tuning circuit comprising local oscillator means for generating a plurality of discrete local oscillator signals individually in sequence, and first control signal-generating means including therein a resonant circuit, having predetermined impedance vs. frequency characteristics, coupled to the local oscillator means to receive the local oscillator signals for generating a pluralitly of first control signals in response to the local oscillator signals, there being one of the aforementioned controls signals generated in response to each of the local oscillator signals. The magnitude of each control signal is proportional to the impedance of the resonant circuit at that frequency. A second control signal-generating means is coupled to the first control signal-generating means to receive the first control signals for rectifying the same and adding thereto a selected direct current threshold signal thereby producing a plurality of second control signals each of which also has a magnitude proportional to the impedance of said resonant circuit at the frequency of the local oscillator. A radio frequency amplifier is coupled between the antenna and the reproducing means, the amplifier including at least one band-pass filter having a voltage-variable reactance device therein coupled to the second control signal-generating means to receive the second control signal. The reactance of the device corresponds to the voltage applied thereto, whereby the pass-band of the filter is automatically and sequentially tuned to pass a band of frequencies about each of the predetermined frequencies in synchronism with the tuning of the receiver thereto.

17 Claims, 7 Drawing Figures

SIGNAL-SEEKING RADIO RECEIVERS

BACKGROUND OF THE INVENTION

1. Field of the Invention

The present invention relates to signal-seeking radio receivers and particularly to improvements in the tuning circuit of a signal-seeking radio receiver such as disclosed in U.S. Pat. No. 3,531,724 to George H. Fathauer and assigned to the assignee of the present invention. The improvements provide substantially improved frequency-selectivity of the receiver to each of the frequencies in a given band of frequencies.

2. Description of the Prior Art

Signal-seeking radio receivers such as the receiver described in the aforementioned patent to the present inventor typically employ a sequential switching circuit and a plurality of local oscillators or crystals for the purpose of automatically and sequentially tuning to a plurality of discrete radio frequencies. All of the frequencies may be included within a signal band or, in the alternative, the receiver may be capable of tuning to two or more bands. In either case, prior art receivers of this type have required the use of a broadly tuned front end. That is, the portions of the circuit between the antenna and the first intermediate frequency (IF) stage of the receiver have been designed to receive and convert radio frequency signals which are distributed over a relatively wide frequency range.

SUMMARY OF THE INVENTION

The present invention provides an improved tuning circuit for signal-seeking radio receivers, the improved tuning circuit providing an automatically controlled front end or radio frequency portion of the receiver.

Broadly, the invention is a tuning circuit for use in a signal-seeking radio receiver which includes an antenna, means for automatically and sequentially tuning the receiver to a plurality of predetermined radio frequencies, and means for reproducing intelligence therein. The receiver includes a local oscillator means for generating a plurality of discrete local oscillator signals individually in sequence. The tuning circuit comprises a first control signal generating means including therein a resonant circuit having predetermined impedance vs. frequency characteristics. The resonant circuit is coupled to the local oscillator means to receive the local oscillator signals and generates a plurality of first control signals in response to the local oscillator signals. There is one of the aforementioned control signals generated in response to each of the local oscillator signals and the magnitude of each of the control signals is proportional to the impedance of the resonant circuit at each of the local oscillator frequencies, respectively. A second control signal-generating means is coupled to the first control signal-generating means to receive the first control signal therefrom. The second control generating circuit rectifies the first control signals and adds thereto a selected direct voltage threshold signal to thereby produce a plurality of second control signals each of which also has a magnitude proportional to the impedance of the resonant circuit at the frequency of the particular control signal. A radio frequency amplifier is coupled between the antenna and the reproducing means, the amplifier including at least one tuned circuit or band-pass filter having a voltage-variable reactance device therein which is coupled to the second control signal generating means to receive the second control signals therefrom. The reactance of the device is proportional to the voltage applied thereto, whereby, the passband of the filter is automatically and sequentially tuned to selectively pass a relatively narrow band of frequencies about each of the aforementioned predetermined frequencies in synchronism with the tuning of the receiver to that frequency.

In a specific embodiment of the invention, the receiver further includes an antenna loading circuit operatively coupled to the second control signal generating means. The antenna loading circuit includes means responsive to the second control signals for altering the tuning of the antenna for optimum reception of radio frequency signals in different radio frequency bands.

In yet another specific embodiment of the invention, the receiver may be provided with two or more front end circuits, each of the front end circuits being adapted to receive radio frequency signals in different radio frequency bands.

It is therefore an object of the invention to provide an improved signal-seeking radio receiver.

It is another object of the invention to provide an improved signal-seeking radio receiver which includes an automatic frequency-selective front end circuit, the selectivity of the circuit being automatically changed in synchronism with sequential scanning of the receiver from one frequency to another.

It is still another object of the invention to provide such a receiver which includes novel circuitry for generating control signals for altering the frequency-selectivity of the receiver.

Another object of the invention is to provide such a receiver wherein the control signal generating circuitry generates a plurality of control signals, one each for each of the scanned frequencies, and wherein the control signal generating circuitry includes a resonant circuit, each of the control signals having a magnitude proportional to the impedance of the resonant circuit at the frequency thereof.

It is still another object of the invention to provide such a receiver which includes tuneable circuits in the radio frequency portion thereof, the tuneable circuits including variable voltage capacitors which are coupled to the second control signal generating means and which are responsive to the second control signals for altering the selectivity of the receiver.

Yet another object of the invention is to provide a control signal generating means which includes a first control signal generator having therein a resonant circuit for generating a family of control signals having magnitudes proportional to the frequency to which the receiver is tuned and including means for changing the relative magnitude of the signals of the family of signals.

BRIEF DESCRIPTION OF THE DRAWINGS

The above-mentioned and other features and objects of this invention and the manner of attaining them will become more apparent and the invention itself will be best understood by reference to the following description of an embodiment of the invention taken in conjunction with the accompanying drawings, wherein.

DESCRIPTION OF A SPECIFIC EMBODIMENT

Figure 1:
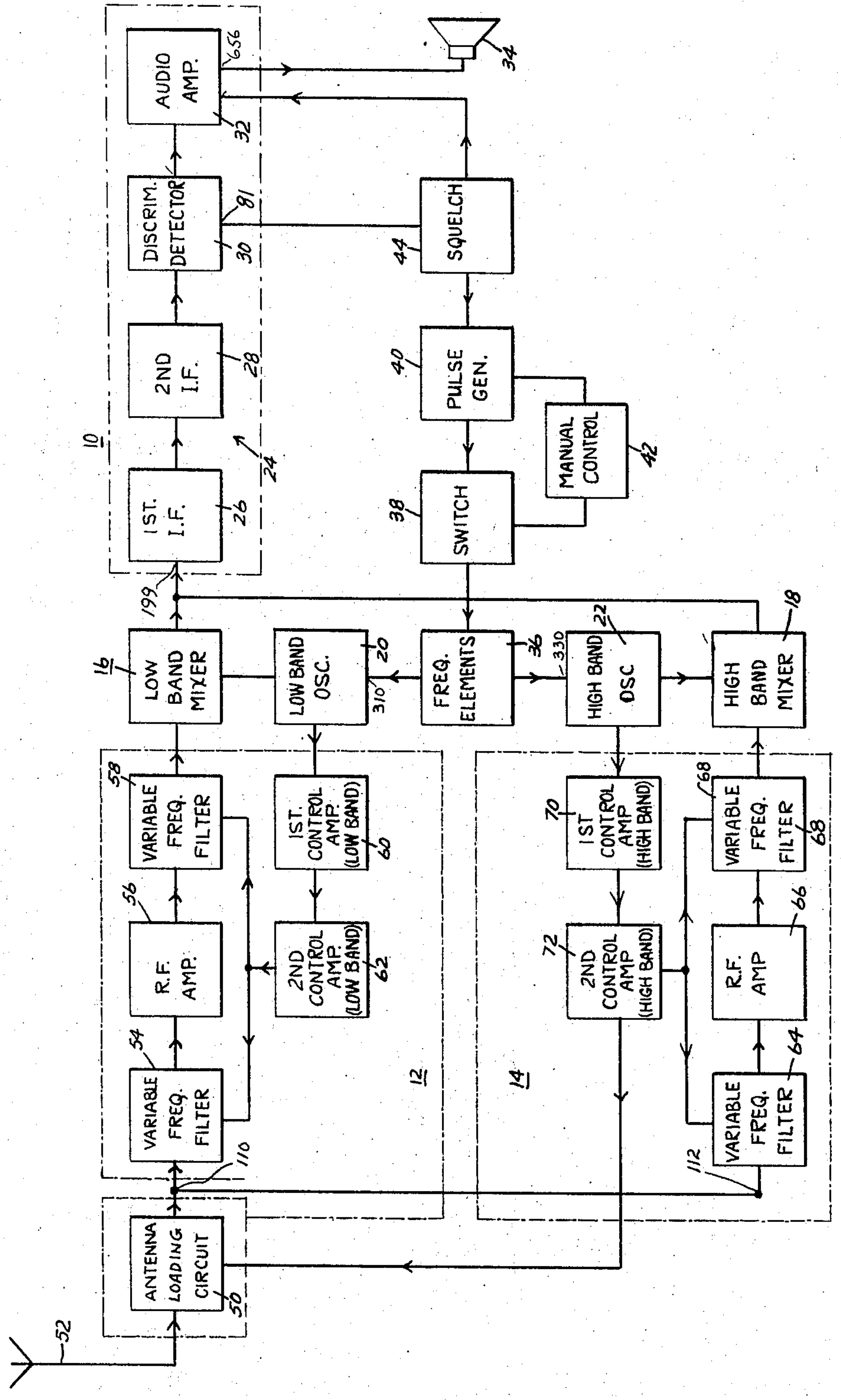
FIG. 1 is a block diagram of one embodiment of this invention.
Figure 5:
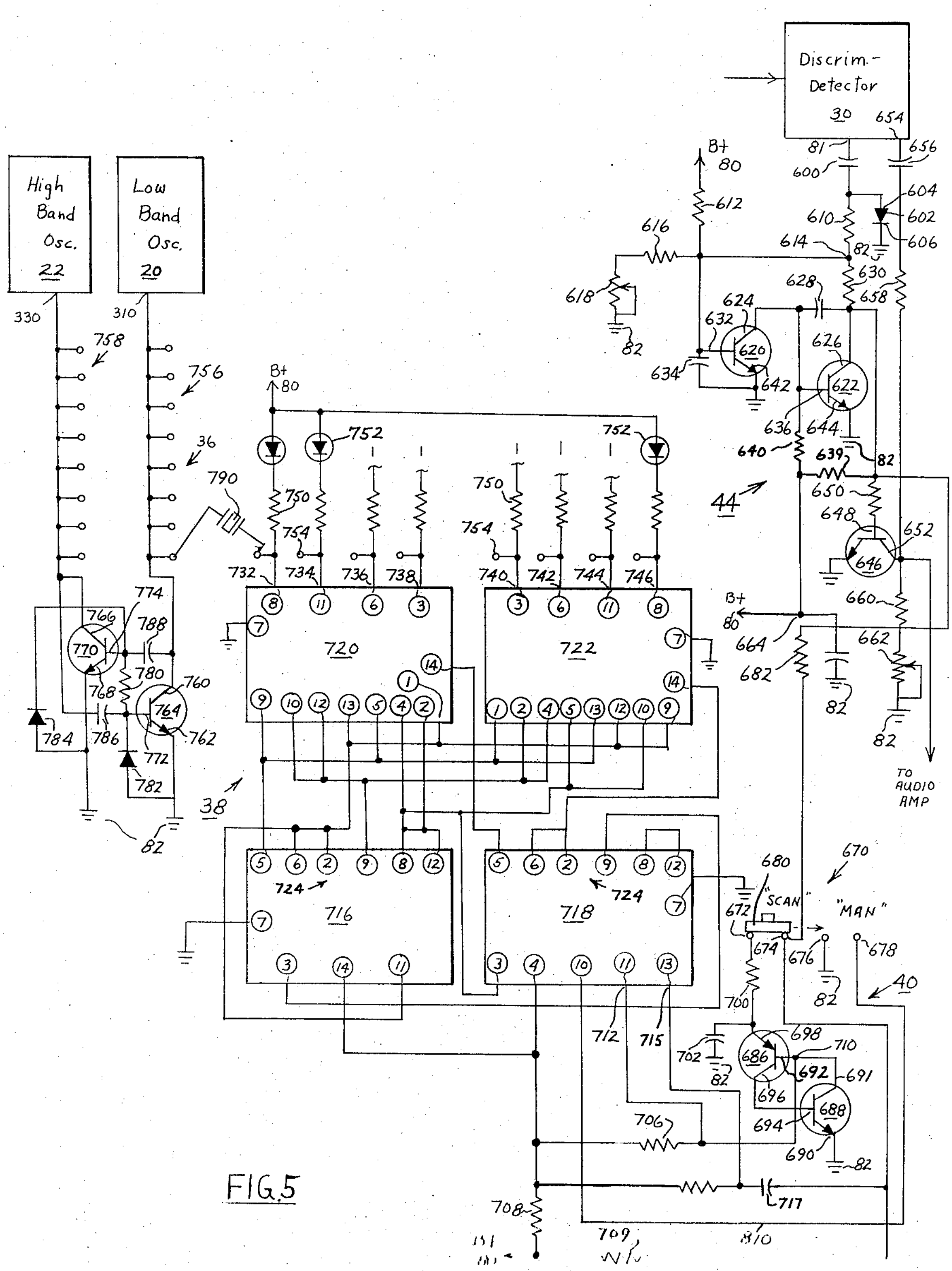
FIG. 5 is an electrical schematic of a sequential switching circuit for use with the present invention.

Referring now to the drawings there is shown in FIG. 1 in block diagram a signal-seeking radio receiver 10 which includes two front end or radio frequency circuits 12 and 14 which, for the present, will be identified as the low-band and high-band radio frequency (RF) circuits, respectively. The low-band and high-band RF circuits are in turn individually coupled to low-band and high-band mixers 16, 18, respectively, there being a low-band oscillator and a high-band oscillator 20, 22, respectively, coupled to the low-band mixer 16 and high-band mixer 18. The output signals from the low-band mixer 16 and high-band mixer 18 feed into a common receiver circuit 24 which may be conventional in structure and includes, for example, a first IF section 26, second IF section 28, a discriminator-detector 30, an audio amplifier 32, and speaker 34. A plurality of frequency determining elements, indicated generally by block 36 are connected to the low-band and high-band oscillators 20, 22. Individual ones of the frequency elements of block 36 are sequentially energized by an electronic switch circuit 38 such as shown in FIG. 5 and described below. Switch circuit 38 is sequenced by means of a pulse generator 40 and control means 42 are provided for locking out individual ones of the frequency elements 36. Operation of the pulse generator 40 is controlled by a squelch circuit 44 which is coupled to a terminal 81 of the discriminator-detector 30 and is responsive to the reception of a signal thereby to disable the pulse generator 40. In the absence of a signal, pulse generator 40 operates continuously to effect switching of the receiver from channel to channel.

Receiver 10 further includes an antenna loading circuit 50 coupled to a conventional receiving antenna 52, radio frequency signals passing from antenna 52 through antenna circuit 50 and into a variable frequency tuned circuit or filtler 54 of RF section 12. Filter 54 is a band-pass filter and the center frequency of the pass-band varies as will be explained below.

RF amplifier 56 includes a second variable frequency tuned circuit 58 through which received signals pass into low-band mixer 16. A first control signal amplifier or generator 60 receives signals from the low-band oscillator 20 to generate a first family of control signals in response thereto. This control signal is fed to a second control signal amplifier or generator 62 to generate a second control signal which is used to control the variable frequency circuit 54 and 58 as will be explained in detail below.

High-band RF section 14 similarly receives radio frequency signals from the antenna tuning circuit 50 the signals passing into a variable frequency tuned circuit 64. These signals are subsequently passed into an RF amplifier 66 having a second variable frequency circuit 68 from whence the signal is passed into the high-band mixer 18. The high-band RF section 14 also includes a first control amplifier 70 and second control amplifer 72 which together generate the required control signals for controlling the operation of the variable frequency tuned circuits 64 and 68. The control signals generated thereby pass from the second control amplifier 72 into the antenna loading circuit 50 to change the tuning thereof as also will be explained in detail below.

The operation of an automatic switching circuit for the receiver is described below and in the co-pending patent application of George H. Fathauer and Cecil E. Mathis, Ser. No. 303,010 filed Nov. 2, 1972, now U.S. Pat. No. 3,821,651, issued June 28, 1974 the specification of which is incorporated herein by reference. Preliminarily, for purposes of explanation, it is sufficient to note that a plurality of different frequency-determining elements, such as crystals, will be individually and sequentially connected to either the low-band or high-band oscillator 20, 22 in any selected sequence. This in turn causes oscillators 20, 22 to generate a plurality of different, discrete local oscillator signals. For example, a sequence of oscillator signals is depicted in FIG. **4*c*** with signals *f*1, *f*4, *f*5 and *f*6 being generated by the low-band oscillator 20 and applied to the low-band mixer 16 and oscillator signals *f*2, *f*3, *f*7, and *f*8 being generated by the high-band oscillator 22 and injected into the high-band mixer 18. Only one local oscillator signal occurs at any one time.

TUNING CIRCUIT

Figure 2:
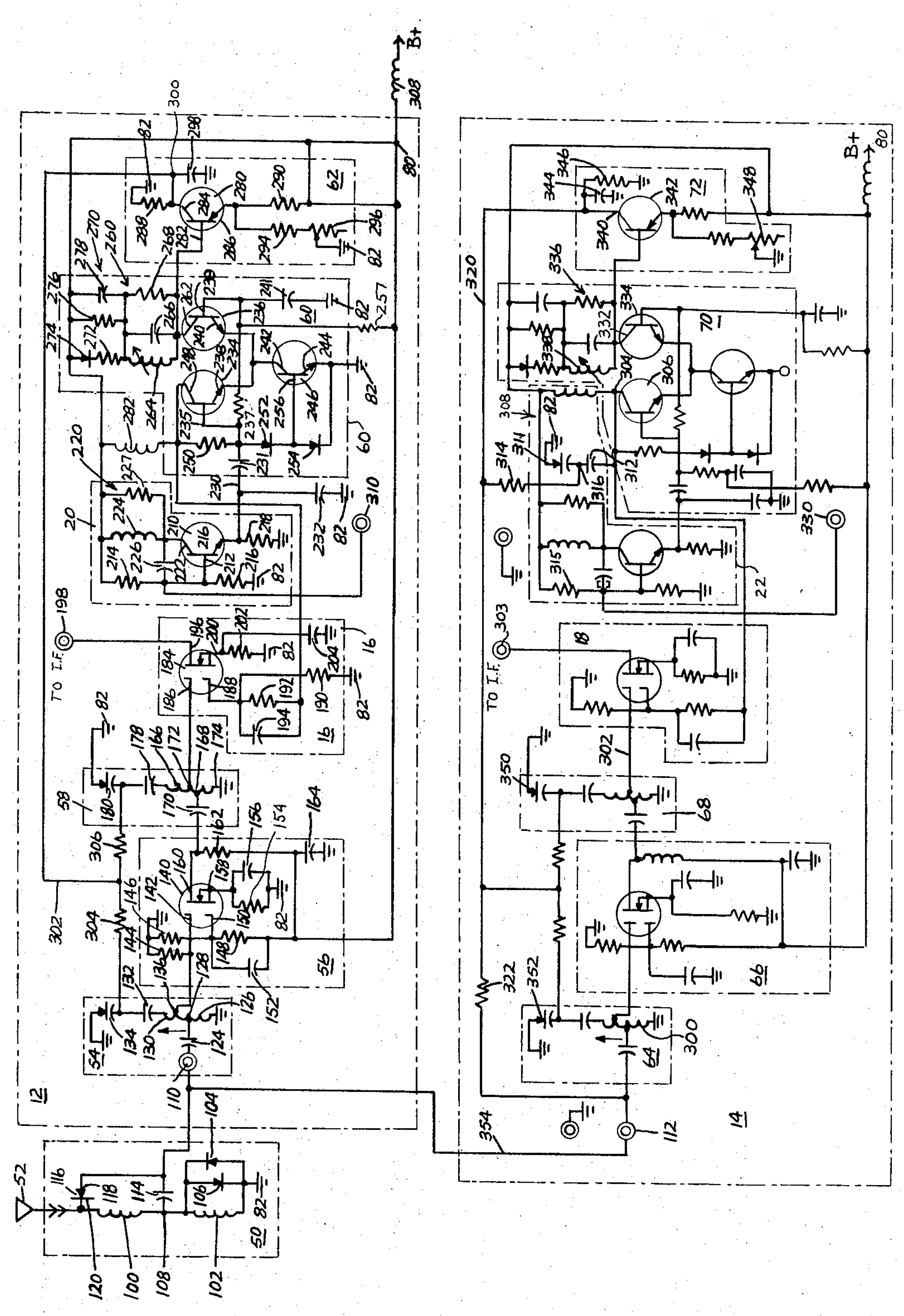
FIG. 2 is an electrical schematic including two radio frequency front end circuits adapted to receive radio frequencies in two different frequency bands and each including a tuning circuit in accordance with the present invention.

Referring now to FIG. 2, there is shown a schematic of the low frequency and high frequency front end circuits 12 and 14 and antenna loading circuit 50. Antenna loading circuit 50 includes a loading coil 100 and a radio frequency (RF) choke 102 connected electrically in series between antenna 52 and ground 82. A pair of diodes 104, 106, are connected in shunt across choke 102 as shown. The commonly connected terminal 108 of coil 100 and choke 102 is coupled to the input terminals 110 and 112 of low frequency and high frequency sections 12, 14, respectively, via a coupling capacitor 114. A switching diode 116 has its anode 118 connected to input terminals 110, 112, and cathode 120 connected to antenna 52.

Tuned circuit 54 includes a capacitor 124 and a radio frequency (RF) coil or inductor 126, capacitor 124 being connected between the input terminal 110 and an input tap 128 of coil 126. One end of coil 128 is grounded as shown and the opposite end 130 thereof is coupled via a capacitor 132 and a voltage variable capacitor (hereinafter referred to as a varactor) 134 to ground 82. The output of tuned circuit 54 is taken from a tap 136 of coil 126.

RF amplifier circuit 56 comprises a field effect transistor (FET) 140 having its control gate 142 coupled to ground 82 via resistor 144 and tap 136. Gate 150 of transistor 140 is coupled to ground 82 by resistor 146, and to a source of positive, direct current potential, hereinafter referred to as B+ 80, via resistor 148, the latter being shunted with a capacitor 152. A biasing resistor 154 and bypass capacitor 156 couple source 158 of FET transistor 140 to ground 82. Drain 160 of FET transistor 140 is coupled to B+ 80 via resistor 162 and to ground 82 via a filter capacitor 164.

The second variable frequency tuned circuit 58 includes an RF coil 166 having an input tap 168 coupled to drain 160 via a coupling capacitor 170 and an output tap 172. One terminal 174 of coil 166 is coupled and the other terminal is coupled to control signal buss 302 through a capacitor 178 and to ground via voltage variable capacitor (varactor) 180 as shown. It will be observed that circuit 58 provides a tuned circuit coupled to drain 160 of transistor 140.

Low-band mixer 16 includes a field effect transistor (FET) 184 having its control gate 186 connected to terminal 172 to accept therefrom received signals and a second gate 188 which is coupled to ground 82 via a biasing resistor 190. Local oscillator signals are applied to second gate 188 through resistor 192, the latter having shunt connected thereacross a capacitor 194. Drain 196 of transistor 184 is connected to mixer output terminal 198 which in turn is connected to the input terminal 199 of the first IF amplifier 26. Source 200 of transistor 184 is coupled to ground 82 through a resistor 202, the latter having thereacross a bypass capacitor 204.

Local oscillator signals for the low-band RF section 12 are provided by low-band oscillator 20 which includes a transistor 210 having its base 212 coupled in sequence via terminal 310, to individual ones of a plurality of frequency determining elements such, for example, crystals, by means of switch circuit 38. Proper biasing of base 212 is effected by biasing resistor 214 connected between base 212 and B+ 80, and biasing resistor 216 connected between base 212 and ground 82. Emitter 216 is connected to ground through a resistor 218.

A wide-band resonant circuit 220 is connected to the collector 222 of transistor 210 and includes coil 224, resistor 227, and feedback capacitor 226, the latter providing the necessary feedback voltage for the oscillator 20.

In operation, oscillator 20 will generate a plurality of local oscillator signals, such as for example, local oscillator signals *f*1, *f*4, *f*5, and *f*6, these local oscillator signals being applied in sequence to mixer 16 where they are heterodyned with a received signal in conventional manner. Because oscillator 20 is a wide-band oscillator, i.e., will oscillate over a relatively wide band of frequencies, the local oscillator signal generated thereby will be determined by the particular frequency element or crysytal connected thereto.

A first control signal generating circuit 60 is coupled to local oscillator 20 via conductor 230 and capacitor 231. Conductor 230 is shunted to ground 82 by capacitor 232. A resistor 237 is coupled between base 235 and base 239 of transistors 234, 236. Base 239 is also shunted to ground by capacitor 241. Control signal generating circuit 60, which in a working embodiment is a single integrated circuit, includes a pair of transistors 234, 236 which are connected together in a differential amplifier configuration. Emitters 238, 240 of transistors 234, 236 are connected in common and electrically in series with the collector and emitter 242, 244, respectively, of a third transistor 246, the latter serving as a constant current generator. Collector 248 of transistor 234 is coupled to B+ 80 via an RF choke 282, and transistor 246 is forwardly biased via resistor 250 and diodes 252, 254 which are coupled between collector 248 and ground 82 and to base 256 of transistor 246 as shown. Base 239 of transistor 236 is connected to B+ 80 via resistor 257. A load circuit 260 is coupled to the collector 262 of transistor 236, load circuit 260 comprising an adjustable reactance coil 264, capacitor 266, and resistor 268, which are connected in parallel and form a resonant circuit having a predetermined impedance vs. frequency characteristic such as, for example, curves 269 and 271 in FIG. 4*a*.

A second parallel circuit 270 includes a series connected resistor 272 and germanium diode 274, load resistor 276, and filter capacitor 278. Circuit 270 provides temperature compensation for circuit 60. It will be observed that the mixer 16 is coupled to collector 248 of transistor 234, and a second output from circuit 60 appears at collector 262 of transistor 236.

A second control signal generating circuit 62 comprises a transistor 280 having its base 283 connected to collector 262 of transistor 236 and its collector and emitter 284, 286 connected to ground 82 via resisitor 288 and B+ via resistor 290, respectively. Biasing for transistor 280 is provided by a resistor 294 and a variable resistor 296 connected electrically in series between emitter 286 and ground 82 as shown. A filter or bypass capacitor 298 is also connected between collector 284 and ground 82. The output from circuit 62 appearing at output terminal 300 is applied via a buss 302 and resistors 304, 306 to varactors 134, 180, respectively. An RF choke 308 is provided in the B+ circuit to remove extraneous noise therefrom.

The operation of the low frequency front end 12 will now be explained. A selected frequency determining element or crystal 790 (FIG. 5) is connected to input terminal 310 by switch circuit 38 as is fully explained below. This frequency determining element causes oscillator circuit 20 to oscillate at the resonant frequency of the frequency determining element. The oscillator signal generated within circuit 20 is applied to the base 235 of transistor 234 via conductor 230 and coupling capacitor 231. This signal in turn produces an oscillatory signal through transistor 234.

Transistor 236 operates conjointly with transistor 234 in conventional differential amplifier mode. That is, any increase in the current flowing through transistor 234 will correspondingly produce a reduction in the current flowing through transistor 236, and vice versa. Correspondingly, when the oscillator signal voltage applied to base 235 swings positively, the current through transistor 234 will increase and the current through transistor 236 decreases proportionately. When the signal voltage applied to base 235 swings negatively, the current through transistor 234 decreases and the current through transistor 236 increases, the sum of the currents through the two transistors remaining essentially constant. It will thus be seen that the signals appearing at the collectors of transistors 234, 236 will both be oscillatory signals having the same frequency but which are out of phase by 180°. The sum of the current of the two signals, that is, the signals passing through transistors 234, 236, will be a constant current signal passing through transistor 246. However, the voltage magnitude of the signals will depend on the impedances of the individual circuits. The signal appearing at collector 248 of transistor 234 is applied directly to gate 188 of transistor 184 via capacitor 194 thereby applying the oscillator signal to the mixer circuit 16.

Figure 4A:
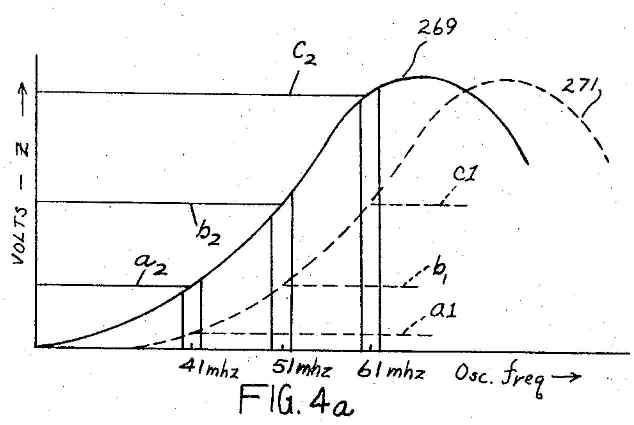
FIGS. 4*a*, 4*b*, & 4*c* are diagrams useful in explaining the operation of the invention.

It will be observed that the load for transistor 236 is the resonant circuit 260. Correspondingly, the magnitude of the output voltage appearing at collected 262 of transistor 236 will change with frequency according to the impedance of the resonant circuit 260. A typical output voltage vs. frequency curve representing the signal of collector 262 is shown in FIG. 4*a* in solid lines at 269. It will further be observed that the impedance of coil 264 can be varied to thereby change the midpoint frequency of the resonant circuit to produce, for example, an impedance vs. frequency curve as shown in dashed lines in FIG. 4*a* at 271. Adjustment of coil 264 does not, however, effect any substantial change in the shape of the curve, but rather only alters its displacement on the frequency axis.

Still referring to FIG. 4*a*, it will now be apparent that for each signal of different frequency that is applied to circuit 60, an output signal or voltage will be generated at collector 262 having a magnitude dependent upon the impedance of the tank circuit 260 at that frequency.

Figure 4B:
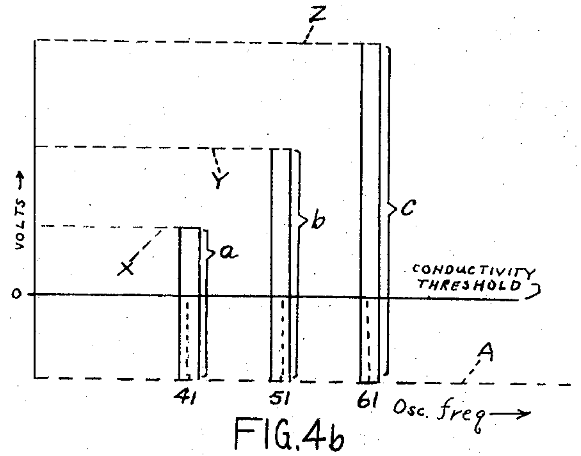
Figure 4C:
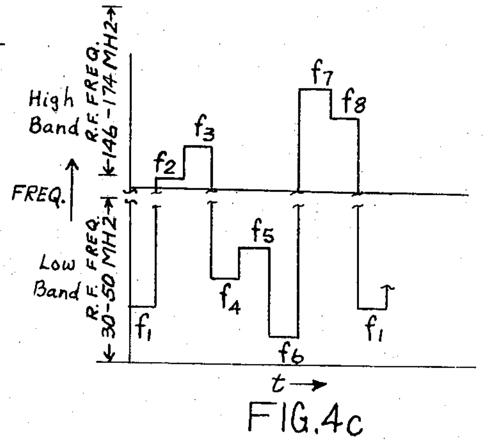

Assuming for example that resonant circuit 260 is adjusted to have a frequency vs. impedance curve 271 as shown in dotted lines in FIG. 4*a*, a signal applied to circuit 260 having a frequency of 41 megacycles will produce an output signal at collector 262 of magnitude "a1," a signal of frequency 51 megacycles will produce a signal having a magnitude of "***b*1," and a signal having a frequency of 61 megacycles will produce an output signal having a magnitude of "*c*1." If resonant circuit 260 is now adjusted to have an impedance vs. frequency characteristic 269 as shown in solid lines in FIG. 4***a*, the 41 megacycle signal will generate an output signal at collector 262 having a magnitude "a2", the 51 megacycle signal will generate an output signal having a magnitude of "***b*2" and the 61 megacycle will generate an output signal having a magnitude of "c2.**"

It can now be seen that by simple adjustment of the resonant frequency of resonant circuit 260, a family, i.e., ***a*1, *b*1, and *c*1 or *a*2, *b*2, and *c*2, etc. can be generated at collector 262 with the relative magnitudes of the signals being easily and controllably altered by a simple alteration of the resonant frequency of circuit 260. There will be as many signals in each family as there are different frequencies applied to circuit 60.**

The family of signals appearing at collector 262 is in turn applied to base 282 of transistor 280. Transistor 280 is normally biased non-conductive whereby the signal appearing at collector 284 thereof will be a zero amplitude signal. When the oscillator signals are applied to the base 282 thereof, transistor 280 is rendered alternately conductive and non-conductive thereby rectifying the oscillatory signals. Thus the positive portions of the oscillatory signal produce an intermittent current signal. This alternating component of the signal appearing at collector 284 is in turn filtered or smoothed by means of capacitor 298 and resistor 288. This result is effected by reason of resistor 288 providing the only discharge path for capacitor 298 while the charging path for capacitor 298 is through transistor 280. Simultaneously, the biasing voltage applied to emitter 286 can be adjusted via resistor 296. This, in turn, determines the magnitude (voltage) of the oscillator signals applied to base 282 required to render transistor 280 conductive and, therefore, the absolute magnitude of the rectified signals appearing at terminal 300. Correspondingly, the signal appearing at collector 284 may be considered to consist of a direct current component to which is added a second direct current component. One component is of constant value determined by the biasing of transistor 280 and the other component will have a magnitude proportional to the frequency of the signal applied to the base 282 of transistor 280, i.e., the frequency of the local oscillator signals applied thereto.

It will be observed that the magnitude of the first mentioned direct current component is altered by adjustment of variable resistor 296 to provide any desired threshold value. The signal summing is graphically illustrated in FIG. 4*b*. The threshold or quiescent bias level of transistor 280 is indicated by dashed line A. To this threshold signal is added signals such as "*a*," "*b*," and "*c*" to thereby generate a second family of signals of magnitudes X, Y, and Z.

Signals X, Y, and Z are applied to varactors 134 and 180 by conductor 302 and resistors 304, 306. Correspondingly, the reactance of varactors 134, 180 is altered to thereby vary the resonant frequency of circuits 54 and 58. It will now be apparent that the pass-band of circuits 54 and 58 can be selectively altered, with the center frequency of the circuits 54, 58 being determined by the magnitude of signals X, Y, and Z. The pass-bands and center frequencies will be different for each of the signals applied and, by proper adjustment of the relative magnitude of signals X, Y, Z, and threshold signal "A," the pass-bands of circuits 54, 56 can be altered to pass a band of radio frequencies corresponding to the local oscillator frequencies which are used to produce signals "*a*," "*b*," and "*c*." Further, circuits 54, 58 will filter out or remove extraneous signals and noise outside of the pass-bands thereof for each of the signals of the families of signals. As a result, the sensitivity of the RF amplifier circuit 56 can be substantially increased for the frequency of the received signal while maintaining a very high signal-to-noise ratio and frequency selectivity.

Referring again to FIG. 2 a second front end of RF circuit 14 is shown in schematic form. This circuit is similar to low frequency front end circuit 12 but is adapted for reception of signals in the high frequency or VHF band.

Circuit 14 includes a variable frequency tuned circuit or filter 64 which is identical configuration to filter circuit 54 except that it incorporates components of different values such that the circuit is adapted to amplify and pass signals of higher frequency, i.e., signals in the very high frequency range ranging from 146 to 174 MHZ. Similarly, circuit 14 includes a radio frequency amplifier 66 substantially identical to radio frequency amplifier 56, there being only minor alterations as shown, in the biasing circuitry of amplifier 66 to better adapt same for operation in the high frequency range. Received signals are passed from tuned circuit 64 to RF amplifier circuit 66 via input inductor 300 as shown. Amplifier 66 includes a second tuned circuit or filter 68 identical in structure to tuned circuit 58 but, again, utilizing different component values to adapt the filter to pass higher frequency signals. High-band mixer 18 is identical to mixer circuit 16 and receives signals from resonant circuit 68 via conductor 302. The output signal from mixer 18 appears at terminal 303 which, in turn, is connected to first IF input terminal.

In like manner, high-band oscillator 22 and first and second high-band control signal-generating circuits 70, 72 are identical to low-band oscillator 20, and first and second low-band control signal-generating cicuits 60, 62 with the following exceptions. The output signal from first control circuit 70, which appears at collector 304 of transistor 306, is applied to a frequency tripler circuit 308 which includes a varactor 311 and a capacitor 312 connected electrically in series between collector 304 and ground 82, there being a coupling resisitor 314 connected between the common terminal 316 of capacitor 308 and varactor 311 and control signal buss 320. Varactor 311 is coupled to receive the control signals from circuit 72 to thereby automatically tune tripler 308 to the third harmonic frequency of the signal generated by oscillator 22. A resistor 322 is connected electrically in series between control signal buss 320 and the anode 118 of diode 116 in antenna tuning circuit 50 to thereby apply the control signal from the second high frequency control circuit 72 to the antenna tuning circuit 50 for a purpose explained below.

The operation of high frequency front end circuit 14 is also substantially identical to the operation of the low frequency front end circuit 12. That is, a plurality of frequency-determining elements such as crystals are sequentially connected to input terminal 330 of oscillator 22 thereby causing the oscillator 22 to oscillate, in sequence, at a plurality of different frequencies. The signals from oscillator 22 are applied to the first control amplifier 70 from which circuit mixer signals are derived from collector 304, tripled by circuit 308, and applied to mixer 18. Simultaneously, local oscillator signals are derived from collector 332 of transistor 334 and applied to the second control signal generating circuit 72. The voltage of the signals appearing at collector 332 are proportional to the impedance of resonant circuit 336 at the particular frequency of the signal being generated by oscillator 22 at that moment. The impedance vs. frequency characteristics of circuit 336 has a shape similalr to the curve of FIG. 4*a* but wherein the frequency axis will correspond to a signal frequency range from, for example, 146 to 174 megacycles. The curve can similarly be adjusted by adjusting the value of variable inductor 338. The control signal appearing at collector 340 of transistor 342 is filtered by capacitor 344 and resistor 346. Transistor 342 is normally biased non-conductive and determines the absolute magnitude of the control signals, this magnitude being determined by adjustment of variable resistor 348. The control signal is, in turn, applied to varactors 350, 352, 311 of resonant circuits 68 and 64 and tripler circuit 308, respectively. In addition, this control signal is applied via conductor 354 to anode 118 of diode 116.

It will be apparent that low frequency circuit 12 and high frequency circuit 14 must now operate simultaneously. This is effected by connecting a frequency determining element to only one of oscillators 16, 18 at one time. Further, to this end, provision may be made in the electronic switch circuit described in my copending patent application previously identified for grounding one or the other of oscillators 20, 22 when the other of oscillators 20, 22 has a frequency determining element connected thereto. This disabling is effected by the alternative application of a grounding signal to the frequency-determining element terminals 310, 330.

The control signals appearing on control signal busses 302 and 320 are positive polarity, direct current signals as described above. The signal appearing on buss 320, i.e., the signal generated within high-band circuit 14, is applied to the anode 118 of diodoe 116 of antenna tuning circuit 50. This signal forward biases diode 116 thereby effectively bypassing loading coil 100. When coil 100 is bypassed or shunted, the tuning characteristics of antenna circuit 50 are altered to adapt the same for reception of signals in the high frequency band. When the control signal on buss 320 is absent, i.e., when no local oscillator signals are being generated within high band oscillator 22 and, correspondingly, no control signals are being generated in control circuits 70, 72 only the threshold signal generated within the circuit 72 will be present. This signal will be essentially zero volts and does not forward bias diode 116. Under these conditions, the loading coil 100 is effective to tune the antenna circuit 50 for optimum reception of signals in the low frequency band.

Figure 3:
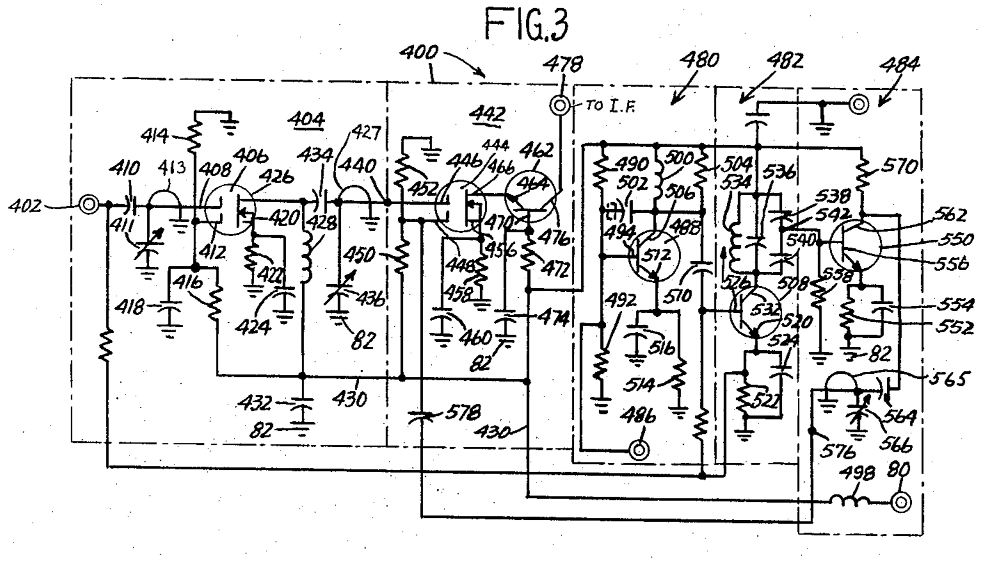
FIG. 3 is an electrical schematic of a radio frequency circuit for use in the invention adapted for use in receiving ultra-high frequency radio signals.

Referring now to FIG. 3, there is illustrated a third radio frequency circuit or front end 400 which may be used with receiver 10. Circuit 400, like circuits 12 and 14, forms the RF section of the receiver 10. However, circuit 400 is adapted for reception and conversion of signals in the ultra-high frequency band, that is, frequencies in the range from 450 to 470 megacycless. Circuit 400 is provided with an input terminal 402 which is connected to antenna 52 via antenna loading circuit 50. Circuit 400 includes a radio frequency amplifier 404 which comprises a field effect transistor 406 having its first gate 408 coupled to input terminal 402 via coupling capacitor 410 and a tuned filter which includes capacitor 411 and inductor 413. Biasing voltage is applied to the second gate 412 of transistor 406 via resistors 414, 416, resistor 414 being bypassed by capacitor 418. Source 420 is coupled to ground by resistor 422, the latter being bypassed by capacitor 424.

A tuned filter is coupled to drain 426 and comprises coil 427 coupled between drain 426 and ground 82 and capacitor 436. A filter capacitor and RF choke 428 are connected between drain 426 and ground 82, and a series connected capacitor 434 is connected between drain 426 and coil 427. The output of RF amplifier 404 appears at terminal 440 and is applied to mixer circuit 442.

Mixer 442 includes a field effect transistor 444 having its control gate 446 connected to terminal 440 to receive radio frequency signals therefrom. Second gate 448 of transistor 444 is biased via resistors 450, 452 which are connected as shown. Source 456 is coupled to ground via resistor 458, the latter being bypassed by capacitor 460. The transistor 462 has its emitter 464 connected to drain 466 of transistor 444. Base 470 of transistor 462 is coupled to B+ buss 430 via resistor 472 which in turn is bypassed with a filter capacitor 474 connected between base 470 and ground 82. Collector 476 of transistor 462 is connected to output terminal 478 of mixer 442. Terminal 478 is, in turn, connected to the input terminal 199 of first IF amplifier 26.

Local oscillator signals for the ultra-high frequency front end 400 are provided by oscillator circuit 480 and first and second tripler circuits 482, 484. Oscillator 480 is provided with an input terminal 486 to which a plurality of frequency determining elements are connected automatically, individually, and in sequence by means of the electronic switch 38.

Oscillator 480 includes a transistor 488 to which is coupled input terminal 486 and appropriate biasing voltages are applied thereto by means of resistors 490, 492 which are connected between base 494 and ground 80 and B+82, respectively. B+80 is again provided with an RF choke 498 for filtering purposes.

A resonant circuit for oscillator 480 includes inductor 500, capacitor 502 and resistor 504. The output from oscillator 480 appears at the collector 506 and is applied to first tripler transistor 508 by a coupling capacitor 510. Emitter 512 of transistor 488 is coupled to ground via resistor 514 and capacitor 516 as shown.

First tripler circuit 482 includes transistor 508 which has its emitter 520 coupled to ground via resistor 522 and bypass capacitor 524. Oscillator signals are received at base 526 from oscillator 480. A parallel resonant circuit 530 is connected to the collector 532 of transistor 508 and includes inductor 534, capacitor 536 and series connected capacitors 538, 540.

Second tripler circuit 484 includes a transistor 550 which has its emitter coupled to ground 82 via a resistor 552 and bypass capacitor 554. Base 556 of transistor 550 is connected to the commonly connected terminal 542 of capacitors 538, 540. A resistor 558 provides biasing for transistor 550. A tripler tank circuit is connected to the collector 562 and includes capacitor 564, coil 565 and variable capacitor 566 connected as shown. B+ potential is applied to transistor 550 via load resistor 570 connected between collector 562 and B+80. The output signal from second tripler circuit 484 appears at output terminal 576 from whence it is applied to second gate 448 of mixer 442 via a coupling capacitor 578.

In operation, radio frequency signals received at input terminal 402 are filtered through a band-pass filter including capacitor 411 and coil 413 to remove extraneous signals and then amplified by transistor 406. The amplified signal is again filtered by capacitor 436 and coil 427 and then injected into gate 446 of transistor 444.

Simultaneously, frequency determining elements (not shown) are individually and sequentially connected to terminal 486 of oscillator 480. Correspondingly, oscillator 480 sequentially generates a plurality of different local oscillator signals. As described above, when a frequency determining element is connected to one or the other front end circuits 12 or 14 the other local oscillator is inoperative and may be disabled.

The local oscillator signal is fed into first tripler 482 where the frequency of the local oscillator signal is multiplied by the factor of three (3). The signal from tripler 482 is applied to the second tripler circuit 484 where the frequency is again multiplied by the factor of three (3) to thereby increase the frequency of the local oscillator signal by a factor of nine (9). The multiplied local oscillator signal is then injected into the second gate 448 of transistor 444 where it is heterodyned against the received signal to produce the first IF signal which appears at drain 466. This signal is passed via transistor 462 to output terminal 478 where it is subsequently fed into the first IF section of the receiver via input terminal 199. Transistor 462 and the associated circuitry function primarily as a low impedance coupling device.

Subsequently demodulation of the received signal is performed in conventional manner by the receiver to reproduce the intelligence therein.

It will be observed that no varactors are used in the ultra-high frequency circuit. This is because narrow-band selectivity of received signals in the ultra-high frequency band is less important by reason of the relatively wide-band width of tuned circuits in this frequency range. For this reason, the first and second control signal generating means which are utilized in the low frequency and high frequency front end 12 and 14 are not incorporated within the ultra-high frequency board. It will be observed that a control signal for forward biasing diode 116 is obtained at the emitter 520 of transistor 508. This signal will be positive when oscillator circuit 480 is operating and will be essentially zero volts when the local oscillator 480 is grounded. Correspondingly, the loading coil 100 in antenna loading circuit 50 is effectively shunted when the ultra-high frequency front end 400 is operating in the same manner that the loading coil 100 is bypassed during operation of the high frequency front end 14. Conversely, the loading coil is effective in the antenna tuning circuit 50 during operation of the low frequency circuit 12 only.

SWITCHING CIRCUIT

Referring now to FIG. 5, there is shown the circuitry of the automatic sequential switching circuit which may be used with the receiver 10 which includes a pulse generator 40, squelch circuit 44, electronic switch circuit 38 and the frequency determining elements and associated circuitry 36. A signal may be derived from discriminator-detector 30 whenever a signal is received by receiver 10. Conversely, when no signal is being received by the receiver 10, no intermediate frequency or audio signals are generated within the receiver, and no signal will appear at output terminal 81. Typically, this signal is referred to as a "squelch" signal and will be an alternating current signal. Terminal 81 is in turn coupled to ground 82 via a capacitor 600 and a diode 602, diode 602 having its anode 604 connected to capacitor 600 and its cathode 606 coupled to ground 82. Anode 604 is connected to a B+80, via resistors 610, 612. The commonly connected terminals of resistors 610, 612, as at 614 are coupled to ground 82 via a resistor 616 and variable resistor 618.

Squelch circuit 44 is connected to terminal 614 and includes a pair of transistors 620, 622. The collector 624 of transistor 620 is coupled to base 636 of transistor 622 via a capacitor 628. Collector 626 is connected to the terminal 614 by a load resistor 630. Base 632 of transistor 620 is also connected to terminal 614 and is coupled to ground 82 by a capacitor 634. Base 636 of transistor 622 is connected to B+ via resistor 640. Emitters 642, 644 are connected to ground 82.

A switching transistor 646 has its base 648 coupled to collector 626 of transistor 622 via a series connected resistor 650, its collector 652 being connected to discriminator-detector 30 audio signal output terminal 654 via capacitor 656 and resistor 658. A resistor 660 and a variable resistor 662 are connected between collector 652 and ground 82.

A three position "scan-manual" switch 670 includes contacts 672, 674, 676 and 678. Contacts 672, 674, and contacts 674, 676, and contacts 676, 678 may be selectively connected together in pairs by means of a sliding armature 680. Contact 674 is connected to terminal 664 by a load resistor 682.

Pulse generator circuit 40 includes first and second pulse generator transistors 686, 688 the emitter 690 of transistor 688 being coupled to ground 82 and the collector 691 thereof being connected to the base 692 of transistor 686. Base 694 of transistor 688 is connected to collector 696 of transistor 686. Emitter 698 is coupled to B+ 80 through a charging resistor 700, switch 670, when the latter is in its "scan" position, i.e., armature 680 bridging contacts 672, 674, and resistor 709, and is coupled to ground 82 via a charging capacitor 702.

Contact 674 is connected to B+ 80 through resistor 682 and resistor 709. Biasing voltage is applied to base 692 and collector 691 through resistors 706, 708. Terminal 710 is the output terminal of pulse generator 40 and is connected to one input terminal 712 of switch circuit 38.

Switch circuit 38 comprises a first pair of integrated circuits 716, 718 which each comprise a plurality of flip-flop circuits. A plurality of NAND gates are also provided as integrated circuits 720, 722, and are connected to the outer terminals 724 of circuits 716, 718 as shown. Specific integrated circuits which may be used for circuit 38 are listed at the end of this specification and the circled numbers in FIG. 5 denote the appropriate pin numbers used in connecting the circuits. Such circuits are known in the prior art and the specific switch circuit illustrated is only by way of an example, it only being necessary that the circuit provide a grounding signal at its output terminals 732 through 746 individually in sequence.

Connected electrically in series between B+ 80 and each one of the output terminals 732 through 746 is a resistor as at 750. A light emitting diode, as at 752, may also be provided as shown to provide a visual indication of the switching sequence.

Also connected individually to output terminals 732 through 746 are a plurality of sockets as at 754.

A first plurality of sockets as at 756 are connected in common to low-band oscillator 20. A second plurality of sockets as at 758 are connected in common to the high-band oscillator 22. Sockets 756 are connected through the collector 760 and emitter 762 of a transistor 764 to ground 82. Sockets 758 are connected through the collector 766 and emitter 768 of a second transistor 770 to ground 82. The bases 772, 774, are coupled together via a resistor 780 and to ground 82 by diodes 782, 784, respectively, as shown. Base 772 is coupled via a capacitor 786 to sockets 758 and base 774 is coupled by a capacitor 788 to sockets 756.

It will be observed that insertion of a crystal or the like 790 between a respective one of sockets 756 and an adjacent one of sockets 754 will connect the crystal 790 to the low-band oscillator 20 while insertion of the crystal 790 between sockets 758 and a respective one of sockets 754 will connect the crystal 790 to the high-band oscillator 22.

The operation of this portion of the circuit will now be explained. Assuming that no signal is being received by the receiver, no intermediate frequency or audio frequency signal will be produced within receiver circuitry. Correspondingly, no signal will appear at terminal 81 of discriminator-detector 30. Simultaneously, B+ potential passes from B+ 80 through resistors 612 and 610 and diode 602 to ground 82, thereby producing a positive potential at terminal 614. This positive potential is applied to base 632 whereby transistor 620 is forwardly biased and turned "on." When transistor 620 is "on," its collector 624 is at or near ground potential thereby applying this potential to the base 636 of transistor 622, biasing same "off." This maintains collector 626 at a positive potential. This latter potential is applieid to the base 648 of transistor 652 being same "on" whereby transistor 652 shunts resistor 660 and variable resistor 662. The audio signal path from discriminator-detector 30 which flows through capacitor 656 and resistor 658 to the audio amplifier (not shown), is therefore shunted to ground 82 through transistor 646.

The potential appearing at collector 626 maintains a positive potential at terminal 664, this potential enabling capacitor 702 to charge. A positive potential of magnitude less than B+ potential is applied to base 694 of transistor 688. Consequentially, when the charging potential on capacitor 702 reaches a sufficient positive potential level, transistor 686 becomes forward biased and turns "on." When transistor 686 turns on, positive potential is applied to the base 694 of transistor 688 rendering same "on" whereby collector 690 thereof is essentially grounded. This in turn discharges capacitor 702, lowering the potential thereof, and rendering transistor 686 again non-conductive. It will now be observed that transistors 686, 688 comprise a relaxation oscillator which produces a repeating pulse signal at output terminal 710. This repeating pulse signal is in turn applied to input terminal 712 of switch circuit 38 to effect the sequential switching thereof.

As switch 38 proceeds through its switching sequence, output terminals 732 through 746 thereof will, in sequence, be grounded, all of the other output terminals thereof remaining at a positive potential. This sequential grounding of terminals 732 through 746, in sequence, grounds one terminal of crystals 790. As each crystal is "grounded," it is activated thereby causing the low-band oscillator 20 or high-band oscillator 22 to oscillate at the frequency associated therewith.

Thus it will be seen that as the crystals 790 are sequentially energized, the plurality of different, discrete frequencies will be generated by the low-band and high-band oscillators 20, 22, for the purpose of converting received radio frequency signals received by the receiver.

It will further be observed that when a particular one of the crystals is oscillating, the alternating current signal occurring in respective ones of the oscillators 20, 22 will be applied via capacitor 786 or 788 to transistor 764 of transistor 770 which is associated with the other of the oscillators 20, 22. This signal, in turn, renders the last-mentioned transistor conductive thereby grounding all of the sockets 756 or 758 associated with the opposite one of the oscillators, i.e., the oscillator that does not at that moment have a crystal actively coupled thereto.

Sequential switching of switch circuit 38 will continue until a signal is received by the receiver 10. Correspondingly, the receiver 10 will be automatically and sequentially tuned to receive signals at the frequency associated with the crystals 790.

When a signal is received, intermediate frequency signals will appear at terminal 81 of discriminator-detector 30. The signal appearing at terminal 81 will be an alternating current signal and will be rectified via diode 602 to produce a negative charge on capacitor 600 thereby lowering the potential appearing at terminal 614. As the potential at terminal 614 drops, transitor 620 will be rendered non-conductive. The potential of collector 624 will rise toward B+ potential thereby applying a positive potential to base 636 to render transistor 622 conductive. When transistor 622 becomes conductive, transistor 646 is rendered non-conductive thereby removing the shunt from resistors 660, 662. This in turn, permits the audio signal appearing at terminal 654 of discriminator-detector 30 to pass to the audio amplifier (not shown) for reproduction.

Further, when transistor 622 is rendered conductive, it lowers the potential appearing at terminal 664 to thereby effectively reduce the charging potential applied to charging capacitor 702. Correspondingly, capacitor 702 does not charge sufficiently to render transistor 686 conductive and transistors 686, 688 remain non-conductive and no repeating pulse signal is produced. Correspondingly, switch circuit 38 ceases to sequence and the receiver will remain tuned to the signal to which it was tuned when it first received a signal.

When the signal being received by receiver 10 terminates or ceases, the signal appearing at terminal 81 will again disappear and the receiver 10 will resume sequential scanning until another signal is detected.

In the above description it has been assumed that scan-manual switch 670 was in its "scan" position. However, it will be observed that when the scan switch 670 has its armature 680 moved into the "manual" position, terminal 674 thereof will be grounded to terminal 676, and the source of charging potential for charging capacitor 702 is removed. Under these conditions, pulse generator 40 and switch circuit 38 will remain static and sequential switching of the circuit will be terminated. However, movement of the armature 680 to its third position bridging terminal 676, 678 will apply a ground to switch circuit 38 via conductor 810. When armature 680 is returned to a position bridging contacts 674, 676, a "ground" will be momentarily applied to switch 38 input terminal 715 by reason of capacitor 717 causing switch 38 to perform a single switch cycle and tuning the receiver to receive the next frequency in its normal switching sequence.

From the above description it will now be apparent that the novel tuning circuit of the present invention provides an effective and readily controlled means for increasing the selectivity of the front end or radio frequency circuits of a signal-seeking receiver of the type described. The circuit incorporates first and second control signal generating circuits, such as circuit 60, 62 of low frequency front end 12 and 70, 72 of high freqency front end 14, which circuits receive signals from respective local oscillator circuits 20 and 22 and generate a plurality of control signals having magnitudes proportional to the frequency of the local oscillator signals. The relative magnitude of the control signals can be controlled by a simple adjustment of the resonant circuit in the first control signal amplifiers 60 and 70 and the absolute magnitude of the control signals can be controlled or varied by adjusting the variable resistors 296 and 348 in the second control signal amplifiers 62 and 72. Each of the control signals of the families, i.e., X, Y, Z (FIG. 4*b*) of control signals occur simultaneously with the generation of the individual local oscillator signals. The control signals in turn are applied to voltage variable capacitors (varactors) such as varactors 134 and 180 or 350, 352 to provide variably tuned resonant circuits within the RF portions 12, 14. These circuits can thereby be fabricated to have relatively narrow pass-bands with the center frequency of the pass-band being varied in synchronism with the generation of the control signals and tuning of the receiver.

The circuit of the present invention further effects automatic tuning of the antenna tuning circuit 50 by automatically enabling or disabling the antenna loading coil 100 therein, this effect again being controlled by the control signals generated within the low and high frequency circuits 12, 14.

In the event the receiver is to be used for reception of signals in the ultra-high frequency band, the narrow band tuned circuits in the RF section of the receiver are not required and a single control signal is generated for automatically enabling or disabling the antenna loading coil 100 only.

All of the front end circuits above described, i.e., the low frequency, high frequency, and ultra-high frequency front end circuits 12, 14, and 400, respectively, are compatible and may be interchanged within the receiver simply by substituting one of the circuits for any of the other circuits.

It will further be observed that the control signal generating circuits do not depend upon the use of highly linear components or hand matching of components for effective operation. Rather, the desired relative magnitudes and absolute magnitudes of the control signals are simply and readily achieved by simple adjustments of components within the first and second control signal generating circuits 60, 62, and 70, 72.

While there have been described above the principles of this invention in connection with specific apparatus, it is to be clearly understood that this description is made only by way of example and not as a limitation to the scope of the invention.

In a working embodiment of the invention, the following component values are used:

FRONT END SECTIONS 12, 14

| | |
|---|---|
| Transistors | |
| 140, 184, 406, 444 | 3N 201 T. I. |
| | 216 2N 3563 F. C. |
| 280 | 2N 3640 |
| 462, 482, 508, 550 | 2N 3562 F. C. |
| Resistors | |
| 144 | 4.7 K ohms |
| 146 | 15 K |
| 148, 154 | 22 K |
| 162 | 470 |
| 192 | 47 K |
| 202 | 100 |
| 214, 216 | 33 K |
| 218 | 330 |
| 227 | 470 |
| 272, 276 | 150 |
| 268 | 560 |
| 237 | 1 K |
| 257 | 22 K |
| 288 | 6.8 K |
| 290 | 270 |
| 294 | 4.7 K |
| 296 | 10 K (potentiometer) |
| Capacitors | |
| 114, 132, 152, 156 | |
| 178, 194, 204, 231 | |
| 241, 278, 298 | .001 mfd |
| 124 | 220 pfd |
| 134, 180 | A-225-1 vvd |
| 170 | 470 pfd |
| 226 | 6.8 pfd |
| 266 | 10 pfd |
| Inductors | |
| 100 | A-219-1 loading coil |
| 102, 282, 308 | A-218-1 RF choke |
| 126 | B-209-1 Antenna coil |
| 174 | B-208-2 RF coil |
| 224 | A-281-2 RF choke |
| 264 | B-209-1 Tracking coil |
| Diodes | |
| 274 | 1N 34A |
| 104, 106, 116 | 1N 4148 |
| Control Signal Generator 60 | Integrated Circuit LM 703LN Nat. |
| High Frequency Section 14 and Ultra-high Frequency Section 400 Reference | |

-Continued

| FRONT END SECTIONS 12, 14 |
|---|
| "Bearcat III FM Monitor Receiver Model BC3-1, H, U, L/H. L/U, H, U" Operating Instructions, Electra Corporation Cumberland Indiana 46229, Copyright 1971 Electra Corporation |

| SWITCHING CIRCUITRY | |
|---|---|
| Transistors | |
| 620, 622, 646, 688 | MPS 3393 |
| 686 | 2N 3640 |
| 770, 764 | 2N 3665 |
| Diodes | |
| 602, 782, 784 | 1N 34A |
| Integrated Circuits | |
| 716, 718 | 5N7474 |
| 720, 722 | 5N7426 |
| Resistors | |
| 610 | 10K ohms |
| 616 | 7.2 K ohms |
| 618 | 5 K ohms |
| 630 | 417 Meg ohms |
| 650 | 10 K ohms |
| 660 | 2.2 K ohms |
| 662 | 100 K ohms |
| 640 | 1.5 K ohms |
| 682, 706 | 47 K ohms |
| 700 | 100 ohms |
| 700 | 470 K ohms |
| 750 | 470 ohms |
| 780 | k ohms |
| 639 | 33 K ohms. |
| Capacitors | |
| 600, 656, 634 | .01 microfarads |
| 702 | .047 do. |
| 628 | .22 do. |
| 786, 788 | 22 picofarads |
| 717 | .01 microfarads |

What is claimed is:

1. For use in a signal-seeking radio receiver which includes an antenna, a receiver mixer and local oscillator means for generating a plurality of different frequency local oscillator signals automatically in seqence, thereby automatically and sequentially to tune said receiver to receive a predetermined spectrum of radio frequency signals, means for holding said receiver tuned to those signals in response to reception thereof, and means for reproducing the intelligence therein, a tuning circuit comprising:

a. first control signal generating means coupled to said local oscillator means to receive said different frequency local oscillator signals for generating a plurality of first control signals, there being one of said control signals generated in response to each of said local oscillator signals, said first control signal generating means including therein a resonant circuit having a predetermined impedance vs. frequency characteristic, the magnitude of each said control signal being proportional to the impedance of said resonant circuit at each of the respective frequencies of said local oscilator, said resonant circuit including means for selectively altering said characteristic thereby to selectively alter the relative magnitudes of said first control signals;

b. second control signal generating means coupled to said first control signal generating means to receive said first control signals for adding thereto a signal of predetermined magnitude to produce a plurality of second control signals corresponding to said first control signals but altered in magnitude by said predetermined signal; and c. a radio frequency amplifier coupled between said antenna and said reproducing means, said amplifier including at least one tuned radio frequency circuit, said tuned circuit having a voltage-variable reactance device therein which determines the pass-band thereof coupled to said second control signal generating means to receive said second control signals, the reactance of said device corresponding to the magnitude of the signal applied thereto, whereby, the pass-band of said tuned circuit is automatically and sequentially tuned to pass a band of frequencies about each of said predetermined radio frequencies in synchronism with the tuning of said receiver thereto; said first control signals being alternating current signals, the second control signal generating means including means for rectifying said first control signals, said predetermined signal and said second control signals being direct current signals, said first control signal generating means including a first amplifier circuit having a load circuit, said resonant circuit being in said load circuit.

2. The circuit of claim 1 wherein said first control signal generating means includes a second amplifier circuit, said receiver mixer circuit being coupled to said second amplifier circuit to receive said local oscillator signals therefrom.

3. The circuit of claim 2 wherein said second amplifier circuit is coupled to said local oscillator means to receive said local oscillator signals, said control signals generated in said first amplifier circuit having frequencies equal to said local oscillator signals.

4. The circuit of claim 2 weherein said resonant circuit includes a resistor, capacitor, and inductor, the reactance of said inductor being adjustable whereby the resonant frequency of said resonant circuit may be adjusted.

5. The circuit of claim 4 wherein said first control signal generating means includes means for generating a family of alternating current signals having frequencies corresponding to respective ones of said local oscillator signals and magnitudes proportional to the impedance of said resonant circuit at the respective frequencies of said family of signals, the relative magnitude of said first control signals being changed in synchronism with adjustment of said inductor.

6. The circuit of claim 5 wherein said first amplifier circuit includes a transistor, said resonant circuit being connected in series with the collector and emitter thereof.

7. The circuit of claim 6 wherein said second control signal generating means includes a third amplifier circuit having an input and an output circuit, rectifying means including a resistor and a capacitor coupled to said third amplifier output circuit, the time constant of the last-mentioned resistor and capacitor being substantially greater than the repetition period of said local oscillator signals.

8. The circuit of claim 7 wherein said third amplifier includes biasing means for controlling the conductivity of said transistor thereof, said biasing means including a variable resistor, the magnitude of said predetermined signal being related to the selected resistance of the last-mentioned variable resistor.

9. The circuit of claim 8 wherein said resistor and capacitor of said rectifying means is in the output circuit of said third amplifier and connected together such that the discharge path for the last-mentioned capacitor is through the last-mentioned resistor.

10. The circuit of claim 9 wherein said first control signal generating means further includes a constant current generator, said mixer being coupled to said constant current generator whereby the magnitude of said local oscillator signals is substantially a constant.

11. The circuit of claim 1 wherein said voltage-variable reactance device is a voltage-variable capacitor, said tuned circuit further including an inductor, said voltage-variable capacitor being coupled to said second control signal generating means to receive said second control signals therefrom, the resonant frequency of said tuned circuit being related to the magnitude of said second control signal, the pass-band of said tuned circuit being substantially constant.

12. The circuit of claim 11 wherein said radio frequency amplifier includes a second tuned circuit, said second tuned circuit including a second voltage-variable reactance device therein and an inductor coupled to said second control signal generating means to receive said second control signals.

13. The circuit of claim 12 wherein said second voltage-variable reactance device is a voltage-variable capacitor having a capacitance related to the magnitude of a voltage applied thereto, the resonant frequency of said second tuned circuit being directly related to the magnitude of the voltage applied thereto.

14. The circuit of claim 13 wherein each said tuned circuit includes a second capacitor connected electrically in series between one terminal of said voltage-variable capacitor and one terminal of said inductor thereof, the opposite terminals of said voltage-variable capacitor and said inductor being connected to ground, said inductor including an input and an output tap adapted to receive and transmit signals, respectively.

15. The circuit of claim 1 wherein said receiver includes means for receiving radio frequency signals in at least two different radio frequency bands, said means including a radio frequency amplifier, mixer, and local oscillator means for each of said bands, said receiver further including means coupled between said antenna and said receiving means for loading said antenna for optimum reception of signals in each of said bands, said antenna loading means including means coupled to said second control signal generating means to receive said second control signals and responsive thereto for altering the tuned frequency of said antenna circuit.

16. The circuit of claim 15 wherein said antenna loading means includes a radio frequency coil and a loading coil, said loading altering means including means for shunting said loading coil in response to said second control signals.

17. The circuit of claim 16 wherein said loading means includes a diode connected electrically in shunt with said loading coil, said diode being connected to said second control signal generating means and forwardly biased by said second control signals and reverse biased in the absence thereof.

* * * * *

UNITED STATES PATENT OFFICE
CERTIFICATE OF CORRECTION

Patent No. 3,873,924 Dated March 25, 1975

Inventor(s) George H. Fathauer

It is certified that error appears in the above-identified patent and that said Letters Patent are hereby corrected as shown below:

IN THE SPECIFICATION

Col. 3, line 46, "filtler" should be --filter--
Col. 4, line 66, --to ground-- should be inserted after "coupled"
Col. 6, line 62, "collected" should be --collector--
Col. 9, line 45, "now" should be --not--
Col. 9, line 61, "diodoe" should be --diode--
Col. 10, line 16, "megacycless" should be --megacycles--
Col. 12, line 42, --80-- should be inserted after "B+"
Col. 13, line 63, "applieid" should be --applied--
Col. 13, line 63, "being" should be --biasing--
Col. 16, line 59, "B-209-1" should be --B-208-1--
Col. 16, line 61, "A-281-2" should be --A-218-2--

IN THE CLAIMS

Claim 4, col. 18, line 36, "weherein" should be --wherein--

Signed and Sealed this

*twenty-ninth* Day of *July 1975*

[SEAL]

*Attest:*

RUTH C. MASON
*Attesting Officer*

C. MARSHALL DANN
*Commissioner of Patents and Trademarks*